United States Patent [19]

Askeland et al.

[11] Patent Number: 4,761,180

[45] Date of Patent: Aug. 2, 1988

[54] DYES CONTAINING TETRAMETHYLAMMONIUM CATION FOR INK-JET PRINTING INKS

[75] Inventors: Ronald A. Askeland, San Diego; William D. Kappele, Escondido, both of Calif.; Norman E. Pawlowski, Corvallis, Oreg.; John L. Stoffel, San Diego, Calif.

[73] Assignee: Hewlett-Packard Company, Palo Alto, Calif.

[21] Appl. No.: 11,190

[22] Filed: Feb. 5, 1987

Related U.S. Application Data

[63] Continuation-in-part of Ser. No. 900,953, Aug. 27, 1986, abandoned.

[51] Int. Cl.$^4$ .............................................. C09D 11/02
[52] U.S. Cl. ...................................... 106/22; 106/20

[58] Field of Search .............................. 106/22, 20, 23; 260/DIG. 38; 523/160

[56] References Cited

U.S. PATENT DOCUMENTS

| 4,605,442 | 8/1986 | Kawashita et al. | 106/22 |
| 4,620,876 | 11/1986 | Fujii et al. | 106/22 |
| 4,631,085 | 12/1986 | Kawanishi et al. | 106/22 |
| 4,685,968 | 8/1987 | Palmer | 106/22 |

Primary Examiner—Josephine Barr
Attorney, Agent, or Firm—William J. Bethurum

[57] ABSTRACT

Inks used in ink-jet printing comprise a vehicle and a dye. The dye is typically an anionic dye, associated with undesirable cations such as sodium or potassium cations. Several properties of such inks are improved by replacing at least about one-fourth of such cations on the anionic dye with tetramethylammonium cations.

30 Claims, No Drawings

DYES CONTAINING TETRAMETHYLAMMONIUM CATION FOR INK-JET PRINTING INKS

CROSS-REFERENCE TO RELATED APPLICATION

The present application is a continuation-in-part application of application Ser. No. 06/900,953, filed Aug. 27, 1986 now abandoned.

TECHNICAL FIELD

The present invention relates to ink compositions for ink-jet printers, and, more particularly, to ink compositions in which the solubility of the dye is increased by replacement of cations such as sodium and potassium.

BACKGROUND ART

The use of aqueous-based inks for ink-jet printers is well-known. Such compositions are relatively inexpensive and easy to prepare; typically, the ink comprises water and a glycol ether, usually diethylene glycol (commonly referred to as the vehicle), and a dye. Typically, the water and glycol ether are present in generally the same proportion and the dye, for example, Food Black 2, is present up to about 6% of the total composition, depending on the desired density of the print.

The prior art inks generally use existing commercial dye salts (cation plus dye anion) as formed, which are simply dissolved in the vehicle and filtered to prepare the ink. Such dyes, which generally contain a plurality of sulfonate or carboxylate anion groups, are designed to form solids in paper or cloth, employing cations such as sodium cations. Consequently, the dyes do not easily remain liquid in the orifice of an ink-jet printer.

Thus, a persistent problem associated with aqueous-based inks is their propensity to crust over a period of time, eventually leading to plugging of the orifice in the printer mechanism from which droplets of ink are expelled in the printing operation. Crusting is the crystallization of the ink around the orifice in the print head, causing partial or full blockage of the orifice, leading to misdirection of the drop (partial blockage) or prevention of drop ejection (full blockage). The crusting problem arises from the evaporation of the water from the ink solvent (vehicle) and the consequent precipitation of the dye salt which has become substantially insoluble as a result of this water loss.

Attempts have been made to solve the crusting problem. Hygroscopic agents have been added to reduce the rate of water evaporation by their ability to pick up water vapor from the air. Exemplary of such hygroscopic agents are water-soluble polymers, alkanol amines, amides and polyhydric alcohols.

While some improvement has been realized with these hygroscopic agents, a total solution to the crusting problems has not yet been achieved. Further, apparently no methods are known to prevent crusting of the anionic dyes in mildly acidic to mildly basic aqueous-based inks (pH 4 to 9).

Attempts are continuing to develop inks in which the dye solubility is increased.

Other approaches include developing new dyes for ink-jet inks. For example, U.S. Pat. No. 4,557,761 discloses a variety of sulfonate-containing dyes with cations such as sodium, potassium, lithium, ammonium and amine salt cations.

However, as shown above, dyes with sodium cations have certain deficiencies. Dyes with potassium cations also buffer from certain deficiencies, notably evidencing crusting. Dyes with ammonium cations, on the other hand, are not stable. Thus, the cations listed in U.S. Pat. No. 4,557,761 cannot be considered to be equivalent.

Finally, many cations are not suitable for dyes employed in inks used in thermal ink-jet printing. In this instance, a problem known as kogation may occur. Kogation is a coined term, unique to thermal ink-jet printing, and describes the extent of decomposition of the ink on the resistors of thermal ink-jet printers as a consequence of heating. Such heating is used to form droplets of ink, which are propelled toward the substrate.

While sodium-containing dyes evidence crusting problems, they also evidence superior kogation properties. Dyes containing other cations which evidence improved crusting also often evidence poor kogation.

DISCLOSURE OF INVENTION

Accordingly, it is an object of the present invention to provide an ink composition evidencing increased dye solubility in the vehicle.

It is an object of this invention to provide an ink in which the crusting problem is minimal.

It is another object of this invention to provide an aqueous-based ink for ink-jet printers in which kogation of the dye in the ink solvent (vehicle) is not adversely affected by partial or total replacement of sodium or other cations.

It is a further object of this invention to provide an aqueous-based ink for ink-jet printers in which the solubility of anionic dyes in mildly acidic to mildly basic media is increased.

Briefly, the ink composition of the invention comprises a vehicle and an anionic dye containing a plurality of undesirable cations associated with each dye molecule, at least about one-fourth of the cations being replaced by tetramethylammonium (TMA) cations.

The dye containing TMA cations evidences increased solubility and reduced crusting in inks commonly used in ink-jet printing, yet shows no tendency toward kogation in thermal ink-jet printing.

BEST MODES FOR CARRYING OUT THE INVENTION

The ink compositions of the invention comprise an aqueous-based vehicle and a dye. The pH of the ink may be maintained in the both the mildly acidic and mildly basic regions, ranging from about 4 to 9.

The vehicle of the ink comprises water and at least one of the glycols and glycol ethers commonly employed in the inks used in ink-jet printing. Examples of such compounds include diethylene glycol, triethylene glycol and polyethylene glycols. The water is present in an amount ranging from about 5 to 95%, the balance being at least one of the glycols and/or glycol ethers. Preferably, the vehicle comprises about 50% water and the balance a glycol ether such as diethylene glycol.

To the vehicle is added up to about 0.1 Molar of a dye, preferably an anionic dye. The amount of the dye added is a function of choice, being largely dependent upon the solubility of the dye in the vehicle (which limits the upper range of dye concentration) and the desired density of the print achieved with the ink (which limits the lower range of dye concentration—typically about 0.005 Molar). Preferably, the concentration of the dye in the ink composition is about 0.065 Molar. For Food Black 2, a dye commonly used in ink-jet inks, the corresponding concentration in wt% ranges from about 0.5 to 10%, with about 6% being preferred.

The dye to which the invention is suitably applied is an organic molecule having at least one negatively charged functional group per molecule. Since sulfonate ($SO_3^-$) and carboxylate ($CO_3^-$) groups are especially benefitted from the practice of the invention, dyes having such groups are preferred. An example of a preferred dye in this regard is Food Black 2 (FB2), which has a mixture of two, three and four sulfonate groups per molecule. (The effective value is about 3.2 sulfonate groups per molecule for commercially available FB2.)

In commercially-prepared dyes, the negative charge of the functional group is most commonly balanced by the presence of positively charged sodium ($Na^+$). However, other cations, such as potassium, ammonium, etc., may also be present.

Other anionic dyes in addition to FB2 may also be suitably employed in the practice of the invention, since, as will be discussed in further detail below, the solubility of the anionic dyes is increased in acidic media by employing the teachings of the invention. Examples of other anionic dyes which may be employed in the ink composition disclosed herein include Direct Red 9, Direct Red 227, Acid Yellow 23, Direct Yellow 86, Acid Blue 9, Direct Blue 86, Direct Blue 199 and Acid Blue 185.

In accordance with the invention, an ink composition suitable for use in ink-jet printers is provided, comprising:

(a) a vehicle comprising about 5 to 95% water and the balance at least some glycol and/or glycol ether; and (b) a dye having at least one negatively charged functional group per molecule, present in an amount up to about 0.1 Molar of the ink composition, the dye having a plurality of anionic sites, originally associated with undesirable cations, at least a portion of the undesirable cations being replaced with tetramethylammonium cations.

While sodium and potassium are considered examples of such undesirable cations, they may be other cations associated with the dye as obtained from a dye manufacturere which may be beneficially replaced in accordance with the teachings of this invention. All such replaceable cations are considered herein to be undesirable cations.

The presence of tetramethylammonium (TMA) cations increases the solubility of the dye in the vehicle without adversely affecting kogation in thermal ink-jet printers. The presence of TMA also reduces crusting of the ink around the orifices of the ink-jet printer, such crusting being caused by evaporation of the water in the vehicle of the ink upon exposure to air.

The partial or complete replacement of undesirable cations by TMA cations may be accomplished by a variety of methods, exemplary of which are ion exchange and reverse osmosis.

In the ion exchange reaction, the dye with undesirable cations, such as sodium cations, is passed through an acid-loaded ion exchange resin. The undesirable cations are replaced with hydrogen cations. The ion-exchanged dye is then reacted with tetramethylammonium hydroxide ($TMA^+$ $OH^-$). The TMA cations replace the hydrogen cations, which react with the hydroxide anions to form water.

Preferably, at least about one-fourth of the undesirable cations must be replaced by the TMA cations in order to obtain the benefits disclosed herein. However, most preferably, at least about one-half of the undesirable cations are replaced in order to obtain the best combination of properties.

It has been observed that the more the TMA replacement for sodium, the better the color density achievable. Further, low temperature start-up (an indication of the ability for the first drop of ink to fire when the printer has been idle for a period of time) is improved.

The presence of TMA permits a concentration of dye up to about 0.1 Molar. Above this level, the viscosity of the ink is undesirably high. For practical purposes and economy, the maximum amount of TMA-dye is about 0.065 Molar; above this level, the color density increases only very slowly.

A slight excess of TMA (about 5 to 10%) may be present in the ink to provide the manufacturer with a margin when making the TMA form of the dye.

INDUSTRIAL APPLICABILITY

The TMA-substituted dyes provided in accordance with the invention find use in inks used in ink-jet printing, particularly in thermal ink-jet printing.

EXAMPLES

A series of dyes were prepared, employing Food Black 2, which originally had all anionic sites complexed with sodium cations. The vehicle comprised diethylene glycol (DEG) and water in the concentrations given below. In the inks listed in Table I below, the dye concentration is given in terms of millimolarity. Comparisons are made with substitutions of sodium cations ranging from no replacement to partial replacement to full replacement by tetramethylammonium (TMA) cation. For comparison, full replacement by ammonium cation ($NH_4$) and potassium (K) are also given.

TABLE I

| Example | Cation | % Na Replacement | Concentration, mM |
|---|---|---|---|
| 1 | Na | — | 39 |
| 2 | TMA | 50 | 39 |
| 3 | TMA | 100 | 39 |
| 4 | TMA | 100 | 52 |
| 5 | TMA | 100 | 65 |
| 6 | $NH_4$ | 100 | 39 |
| 7 | K | 100 | 39 |

The properties of solubility, crusting, room temperature (RT) and low temperature (LT) start-up, kogation, storage and change in color density ($\Delta E$) are listed in Table II below. The solubility is shown for two vehicle concentrations: 50/50 DEG/$H_2O$ and 90/10 DEG/$H_2O$.

Start-up is measured for pens exposed for a period of time to a temperature [room (RT) or 10° C. (LT)] at low relative humidity (RH) to determine whether water loss has been sufficient to cause a significant decrease in the quality of drop ejections.

Storage refers to the stability of chemical and physical properties during storage.

$\Delta E$ is a measure of color density. If the color is measured in CIELAB coordinates, then $\Delta E$ is given by $$\Delta E = [(L_2 - L_1)^2 + (a_2 - a_1)^2 + (b_2 - b_1)^2]^{\frac{1}{2}}$$

where L, a and b are coordinates of reference in CIE-LAB space and 1 refers to the background medium and 2 refers to the sample.

TABLE II

| Example | Solubility 50/50 | Solubility 90/10 | Crusting | Start-up RT | Start-up LT | Kogation | Storage | ΔE |
|---|---|---|---|---|---|---|---|---|
| 1 | F | F | P | G | F | G | G | F |
| 2 |   |   | G |   |   | G | G | F |
| 3 | E | E | E | E | E | G | G | F |
| 4 | E | E | G | E | G | G |   | G |
| 5 | E | E | G | G | G |   |   | E |
| 6 |   |   |   |   |   |   | P |   |
| 7 |   |   | P |   |   |   |   | F |

The foregoing relative observations are based on the following scale, with the definitions of each observation for each property property as follows:

E=Excellent
G=Good
F=Fair
P=Poor.

A perusal of Table II above shows that solubility is enhanced in both 50/50 DEG/H₂O and 90/10 DEG/H₂O for replacement of sodium cations by tetramethylammonium cations. Further, kogation is not adversely affected by such replacement. Other properties of the inks containing TMA-replaced dyes, such as crusting, start-up, storage and print quality are seen to be at least equivalent to those of inks containing sodium cations. Finally, comparison with replacement by other cations (K and NH₄) points up the improvement achieved with the substitution of tetramethylammonium for the undesirable cations.

Thus, an ink composition for ink-jets printers has been provided. The ink comprises an anionic dye in which at least a portion of the associated cations are replaced with tetramethylammonium cations. Various changes and modifications will be readily apparent to those of ordinary skill in the art, and all such changes and modifications are considered to be within the scope of this invention.

What is clamed is:

1. An ink composition suitable for use in ink-jet printers comprising:
   (a) a vehicle comprising about 5 to 95% water and the balance at least one member selected from the group consisting of glycols and glycol ethers; and
   (b) a dye having at least one negatively charged functional group per molecule, present in an amount up to about 0.1 Molar of the vehicle composition, said dye having a plurality of anionic sites, originally associated with undesirable cations, at least a portion of said cations being replaced with tetramethylammonium cations, said portion being in an effective amount to reduce crusting of said ink without affecting kogation.

2. The ink composition of claim 1 wherein said undesirable cations are selected from the group consisting of sodium and potassium cations.

3. The ink composition of claim 1 wherein said member is selected from the groups consisting of diethylene glycol, triethylene glycol and polyethylene glycols.

4. The ink composition of claim 3 wherein said vehicle consists essentially of diethylene glycol, present in an amount of about 50%, and the balance water.

5. The ink composition of claim 1 wherein said dye includes at least one functional group per molecule selected from the group consisting of sulfonate and carboxylate groups.

6. The ink composition of claim 5 wherein said dye is one selected from the group consisting of Food Black 2, Direct Red 9, Direct Red 227, Acid Yellow 23, Direct Yellow 86, Acid Blue 9, Direct Blue 86, Direct Blue 199 and Acid Blue 185.

7. The ink composition of claim 6 wherein said dye comprises Food Black 2.

8. The ink composition of claim 1 wherein at least about one-fourth of said undesirable cations on said dye are replaced with tetramethylammonium cations.

9. The ink composition of claim 8 wherein at least about one-half of said undesirable cations on said dye are replaced with tetramethylammonium cations.

10. An ink composition suitable for use in thermal ink-jet printers comprising:
    (a) a vehicle comprising about 5 to 95% water and the balance at least one member selected from the group consisting of glycols and glycol ethers; and
    (b) a dye having at least one negatively charged functional group per molecule selected from the group consisting of sulfonate and carboxylate anions, said dye present in an amount up to about 0.1 Molar of the vehicle composition, said dye having a plurality of anionic sites, originally associated with sodium cations, at least about one-fourth of said cations being replaced with tetramethylammonium cations.

11. The ink composition of claim 10 wherein said member is selected from the group consisting of diethylene glycol, triethylene glycol and polyethylene glycols.

12. The ink composition of claim 10 wherein said vehicle consists essentially of diethylene glycol, present in an amount of about 50%, and the balance water.

13. The ink composition of claim 10 wherein said dye is one selected from the group consisting of Food Black 2, Direct Red 9, Direct Red 227, Acid Yellow 23, Direct Yellow 86, Acid Blue 9, Direct Blue 86, Direct Blue 199 and Acid Blue 185.

14. The ink composition of claim 13 wherein said dye comprises Food Black 2.

15. The ink composition of claim 10 wherein at least about one-half of said sodium cations on said dye are replaced with tetramethylammonium cations.

16. A process for increasing dye solubility without adversely affecting kogation in an ink comprising a vehicle and a dye, said vehicle comprising about 5 to 95% water and the balance at least one member selected from the group consisting of glycols and glycol ethers and said dye having at least one negatively charged functional group per molecule, said dye being present in an amount up to about 0.1 Molar of the vehicle composition and having a plurality of anionic sites, originally associated with undesirable cations, said process comprising replacing a portion of said cations with tetramethylammonium cations.

17. The process of claim 16 wherein said undesirable cations are selected from the group consisting of sodium and potassium cations.

18. The process of claim 16 wherein said at least one member is selected from the group consisting of diethylene glycol, triethylene glycol and polyethylene glycols.

19. The process of claim 18 wherein said vehicle consists essentially of diethylene glycol, present in an amount of about 50%, and the balance water.

20. The process of claim 16 wherein said dye includes at least one functional group per molecule selected from the group consisting of sulfonate and carboxylate groups.

21. The process of claim 20 wherein said dye is one selected from the group consisting of Food Black 2, Direct Red 9, Direct Red 227, Acid Yellow 23, Direct Yellow 86, Acid Blue 9, Direct Blue 86, Direct Blue 199 and Acid Blue 185.

22. The process of claim 21 wherein said dye comprises Food Black 2.

23. The process of claim 16 wherein at least about one-fourth of said undesirable cations on said dye are replaced with tetramethylammonium cations.

24. The process of claim 23 wherein at least about one-half of said undesirable cations on said dye are replaced with tetramethylammonium cations.

25. A process for increasing dye solubility without adversely affecting kogation in an ink comprising a vehicle and a dye, said vehicle comprising about 5 to 95% water and the balance at least one member selected from the group consisting of glycols and glycol ethers and said dye having at least one negatively charged functional group per molecule selected from the group consisting of sulfonate and carboxylate anions, said dye present in an amount up to about 0.1 Molar of the vehicle composition, said dye having a plurality of anionic sites, originally associated with sodium cations, said process comprising replacing at least about one-fourth of said cations with tetramethylammonium cations.

26. The process of claim 25 wherein said member is selected from the group consisting of diethylene glycol, triethylene glycol and polyethylene glycols.

27. The process of claim 26 wherein said vehicle consists essentially of diethylene glycol, present in an amount of about 50%, and the balance water.

28. The process of claim 27 wherein said dye is one selected from the group consisting of Food Black 2, Direct Red 9, Direct Red 227, Acid Yellow 23, Direct Yellow 86, Acid Blue 9, Direct Blue 86, Direct Blue 199 and Acid Blue 185.

29. The process of claim 28 wherein said dye comprises Food Black 2.

30. The process of claim 25 wherein at least about one-half of said sodium cations on said dye are replaced with tetramethylammonium cations.

* * * * *